DEFENSIVE PUBLICATION T861024

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 8, 1969

861 O.G. 369

778,781

POLYMER COMPOSITIONS CONTAINING FLUORESCENT BRIGHTENING AGENTS

Melvin S. Bloom, Rochester, N.Y., James A. Hill, Dover, Del., and William H. Moore, Kingsport, Tenn. (all % Tennessee Eastman Co., Box 511, Kingsport, Tenn. 37662)

Filed Nov. 25, 1968. Published Apr. 8, 1969

Class 252—301.2

No Drawing. 10 Pages Specification

Polymer compositions, such as polyesters, polyamides, polyolefins and polyacrylonitriles, having enhanced optical properties containing fluorescent brightening agents of the formula

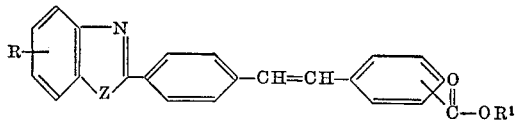

wherein

Z is an oxygen atom, sulfur atom, or an

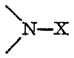

radical wherein X is either an alkyl radical or aryl radical, R is hydrogen, halogen, alkyl, aryl, substituted aryl, hydroxy, alkoxy, aryloxy, acyl, acyloxy, amino, substituted amino, sulfo, substituted sulfonyl, sulfamoyl, substituted sulfamoyl, cyano, thiocyano, thiol, carbamoyl, substituted carbamoyl, carbamoyloxy, or nitro; and $R^1$ is halogen, alkyl, aryl, substituted aryl, hydroxy, alkoxy, aryloxy, acyl, acyloxy, amino, substituted amino, sulfo, substituted sulfonyl, sulfamoyl, substituted sulfamoyl, cyano, thiocyano, thio, carbamoyl, substituted carbamoyl, carbamoyloxy, or nitro.